United States Patent Office 3,704,193
Patented Nov. 28, 1972

3,704,193
METHOD OF STRAIN-HARDENING FOAMED METAL
Alex R. Valdo and Jerry M. Janes, Baton Rouge, La., assignors to Ethyl Corporation, New York, N.Y.
No Drawing. Filed Oct. 5, 1970, Ser. No. 78,214
Int. Cl. C22f 1/04; B32b 3/26, 15/00
U.S. Cl. 156—196
20 Claims

ABSTRACT OF THE DISCLOSURE

Foamed metals and foam metal laminates having greater strength are produced by strain-hardening the foamed metal to improve its strength and to provide a smooth surface for producing laminates having greater resistance to delamination.

BACKGROUND OF THE DISCLOSURE

Field of the invention

The field of this invention is metallurgy and, more particularly, non-ferrous metallurgy.

Description of the prior art

In the art of lamination, that is, the bonding of one distinct substrate by means of an adhesive to another distinct substrate, metal-resinous foam laminates enjoy wide acceptance. This type of laminate is disclosed in U.S. Pat. 3,496,058.

Substitution of a foamed metal substrate for the above-mentioned resinous foam substrate is advantageous for many applications. Thus, the foamed metal is not only light in weight as is the resinous foam, but it is of much greater strength than the resinous foam and is also fire proof. Unfortunately, however, it is difficult to bond the foamed metal to another substrate because of its irregular surface. Also, while the foamed metal is stronger than the resinous foam, it is still much weaker than the unfoamed metal, thus leaving room for improvement in strength characteristics. The principle objective of the present invention therefore resides in increasing the strength and bondability of the foamed metal substrate.

SUMMARY OF THE INVENTION

The present invention involves strain-hardening a foamed metal in order to improve its strength and/or bondability to a separate substrate.

More particularly, the present invention concerns a process for strain-hardening a foamed metal by reducing the thickness of the metal by up to about 50 percent. Even further, the present invention is concerned with a process for laminating a foamed metal by reducing the thickness of the metal so as to provide a smooth surface at least on one side and adhering the smooth surface to a separate substrate. In addition, the invention is concerned with a process for the manufacture of a strengthened foamed metal laminate by strain-hardening the metal to increase its strength and to provide a smooth surface at least on one side of the metal and adhering the smooth surface to a separate substrate.

In accordance with the above-described procedure, the present invention provides improvements which more than adequately achieve the foregoing objective of the invention. Thus, not only is the strength of the metal foam substantially increased by the strain-hardening process, but the bondability of the metal foam to a separate substrate is also considerably improved by the provision of a smooth surface on the substrate as a by-product of the strain-hardening process. This results in a stronger laminate which is more highly resistant to delamination.

DESCRIPTION OF THE PREFERRED EMBODIMENTS

Among the foamed metals suitable for use in this invention, such as aluminum, magnesium, titanium, and the like, aluminum is preferred. Aluminum alloys are highly preferred, and especially desirable are alloys of aluminum with magnesium. Among the aluminum-magnesium alloys, a range of from about 0.1 percent to about 10.0 percent by weight aluminum with from about 5 percent to about 7 percent by weight magnesium is highly desirable.

The first step in the practice of this process is to elevate the temperature of the metal to just below the liquidus temperature. Any amount of heating will improve the efficiency of the present process inasmuch as the metal is more easily deformed while heated. However, strain-hardening can be accomplished without any heating although this is not a preferred procedure. When foamed aluminum is heated, a temperature of from about 500° F. to about 850° F. is preferably employed. Where the material heated is an aluminum-magnesium alloy of from about 93.5 to about 92.5 weight percent aluminum and from about 6.5 to about 7.5 weight percent magnesium, a temperature of from about 500° F. to about 850° F. is preferably employed.

Once a suitable temperature has been reached, it is preferable to allow the foamed metal to "soak" for a certain time. This allows the temperature to become uniform throughout the metal foam. For pure aluminum the soaking time at desired temperature may vary from about 5 minutes to about 24 hours, and for the preferred aluminum-magnesium alloy the time may vary from about 30 minutes to about 3 hours. While soaking is not a necessary or critical aspect of the present invention, it does result in a higher quality product.

Once the temperature of the metal foam has been elevated to the desired extent, and allowed to soak to reach a uniform temperature, it is then ready for the strain-hardening procedure which can be accomplished by several methods, i.e., rolling, stretching, forging, coining, extruding, and the like.

Where the strain-hardening is accomplished by rolling, the heated foamed metal is passed between a set of two rolls which squeeze the metal foam to the desired extent as it is passed therebetween one or more times. The rolls may or may not be heated to about the same temperature of the metal foam. Of course, when the rolls are heated, it is possible to pass the metal foam through the nip of these rolls without cooling the foam. The metal foam is usually reduced not more than about 50 percent of its original thickness. Best results are generally found to require reduction of at least 1 percent. The percent reduction is of course dependent upon the material of the metal foam and the number of passes through the rolling mill. An alloy of 93 weight percent aluminum and 7 weight percent magnesium, foamed in slab form, heated to 850° F., allowed to soak at that temperature overnight and then strain-hardened by hot rolling to achieve a 16.4 percent reduction will show increased flexural strength of about 18 percent.

Strain-hardening may also be accomplished by stretching, as above-mentioned. Stretching is the process of removing warpage of sheet by the application of sufficient tensile force to produce a slight amount of permanent strain. Stretch forming is also a process by which parts requiring large curvatures are made by stretching sheet over a form of the desired shape.

Another means for strain-hardening a foamed metal is by forging. Forging is the deforming of the metal, usually hot, into a desired shape with compressive force, either with or without dies.

Strain-hardening of a foamed metal may also be accomplished by extrusion or extruding the metal. Extrusion is the shaping of metal into a chosen continuous form by forcing it through a die of appropriate shape. In direct extrusion, the die and ram are at opposite ends of the billet (cast or wrought metal slug), and the ram and the final product travel in the same direction. In indirect extrusion, the die and ram are at the same end of the billet, and the final product travels through and in the opposite direction to the ram. Impact extrusion is the process in which the metal is forced by impact to flow around the punch, forming a tbue with a solid bottom.

Coining is a stamping operation wherein the metal is press-formed.

Once the thickness of the foamed metal has been reduced either by rolling, stretching, forging, extruding, coining or the like, the foam is then ready for the lamination process. The strain-hardened foamed metal of this invention are particularly suitable for lamination since the strain-hardening process by its very nature produces a smooth surface on the foam. Thus, normally the foam has a rough surface which is caused by the individual blown cells of the foam structure which leaves a somewhat "bubbly" effect, particularly on the top of the foam. The foam is of course more smooth where it was in contact with a mold wall although even in these areas it still has a somewhat perforated surface. Once the foam has been compressed, the "bubbly" exterior is flattened so that the surface of the foam now presents a greater surface area which improves the adhesiveness of the foam to a separate substrate.

The strain-hardened foamed metals of this invention can be bonded by any of the many well-known adhesives to any other substrate which is suitable for forming a laminate. The foamed metals of this invention are not only useful for the production of laminates of improved strength and greater resistance to the delamination, but also are otherwise useful, for example, as a construction material, as an energy absorption material, and as an acoustical material, and for decorative purposes.

Having thus described the present invention, the following example is presented only as being illustrative and not as being limiting of the invention.

EXAMPLE I

Ten samples of foamed aluminum each about 12" long by 2½" wide by 1½" thick were cut from a sample piece of foamed aluminum. The density of each sample was determined and the density of each sample varied moderately. The flexural strength of foamed aluminum is a function of density.

Five samples without treatment were tested for flexural strength. The flexural strength versus density curve was drawn for the baseline.

Next five samples were heated overnight to 850° F. and were rolled while hot. Three samples were reduced in thickness by one pass through the rolls from an average thickness of 1.507 inches to 1.412 inches. Two samples were rolled while hot by being passed through the rolls three times. The average thickness was reduced from 1.467 inches to 1.265 inches. These five samples were tested for flexural strength. The flexural strength versus density curve was plotted.

From these two curves at 15 lb./ft.³ the flexural strength was increased from about 500 p.s.i. to 600 p.s.i. The surface area of the foamed aluminum available for an adhesive was greatly increased by hot rolling. Only the upper layer of bubbles were deformed.

The foregoing disclosure and description of the invention is illustrative thereof and various changes in the size, shape and materials, as well as in the details of the described processes, may be made within the scope of the appended claims without departing from the spirit of the invention.

What is claimed is:

1. A method of increasing the flexural strength of foamed metal, comprising the step of strain-hardening the foamed metal whereby the thickness of the foamed metal is reduced by up to about 50 percent.

2. The process of claim 1 including heating said metal to a temperature below its liquidus temperature before reducing the thickness of said metal.

3. The process of claim 1 wherein the reduction of thickness is accomplished by rolling.

4. The process of claim 1 wherein the reduction of thickness is accomplished by stretching.

5. The process of claim 1 wherein the reduction of thickness is accomplished by forging.

6. The process of claim 1 wherein the reduction of thickness is accomplished by coining.

7. The process of claim 1 wherein the reduction of thickness is accomplished by extruding.

8. The process of claim 1 wherein said metal is aluminum or an aluminum alloy.

9. The process of claim 1 wherein said thickness is reduced by at least one percent.

10. The process of claim 1 wherein said metal is an aluminum-magnesium alloy which is heated to a temperature of from about 500° F. to about 850° F. prior to strain-hardening the foamed metal.

11. In a process for laminating a foamed metal substrate to another distinct substrate wherein said substrates are bonded together, the improvement therein wherein said foamed metal substrate is strain-hardened, and the thickness of said foamed metal substrate is thereby reduced by up to about 50 percent, to increase its strength and to provide a smooth surface on at least one of its sides prior to bonding said foamed metal substrate to said another substrate.

12. The process of claim 11 including heating said metal to a temperature below its liquidus temperature before reducing the thickness of said metal.

13. The process of claim 11 wherein the reduction of thickness is accomplished by rolling.

14. The process of claim 11 wherein the reduction of thickness is accomplished by stretching.

15. The process of claim 11 wherein the reduction of thickness is accomplished by forging.

16. The process of claim 11 wherein the reduction of thickness is accomplished by coining.

17. The process of claim 11 wherein the reduction of thickness is accomplished by extruding.

18. The process of claim 11 wherein said metal is aluminum or an aluminum alloy.

19. The process of claim 11 wherein said thickness is reduced by at least one percent.

20. The process of claim 11 wherein said metal is an aluminum-magnesium alloy which is heated to a temperature of from about 500° F. to about 850° F. prior to strain-hardening the foamed metal.

References Cited

UNITED STATES PATENTS

| | | | |
|---|---|---|---|
| 2,418,881 | 4/1947 | Hensel et al. | 75—20 F |
| 3,433,632 | 3/1969 | Elbert et al. | 75—20 F |

WILLIAM J. VAN BALEN, Primary Examiner

U.S. Cl. X.R.

29—420.5, 527.5; 75—20 F; 156—229, 281, 322; 161—160, 165